United States Patent [19]
Bayya et al.

[11] Patent Number: 5,786,287
[45] Date of Patent: Jul. 28, 1998

[54] IR TRANSMITTING RARE EARTH GALLOGERMANATE GLASS-CERAMICS

[76] Inventors: Shyam S. Bayya, 7705 Random Run La., Apt. T-4, Falls Church, Va. 22042; Barry B. Harbison, 9914 Macintosh Dr., Dunkirk, Md. 20754; Jasbinder S. Sanghera, 7224 S. Ora Ct., Greenbelt, Md. 20770; Ishwar D. Aggarwal, 7817 S. Valley Dr., Fairfax Station, Va. 22039

[21] Appl. No.: 751,218

[22] Filed: Nov. 15, 1996

[51] Int. Cl.$^6$ .................... C03C 3/253; C03C 4/10
[52] U.S. Cl. .................... 501/10; 501/42; 501/904
[58] Field of Search .................... 501/10, 42, 904

[56] References Cited

U.S. PATENT DOCUMENTS

| | | | |
|---|---|---|---|
| 4,575,493 | 3/1986 | Rauch, Sr. | 501/42 |
| 4,999,321 | 3/1991 | Kohli | 501/42 |
| 5,305,414 | 4/1994 | Higby et al. | 501/42 |
| 5,486,495 | 1/1996 | Jewell et al. | 501/10 |

*Primary Examiner*—Karl Group

[57] ABSTRACT

A glass-ceramic article or composition which has better thermal and physical properties than the competing materials of zinc sulfide, spinel, or magnesium fluoride comprising 2–30 mole percent yttrium oxide and/or rare earth oxide, 25–80 mole percent germanium oxide, and 5–30 mole percent gallium oxide, based on the total moles of yttrium oxide and/or the rare earth oxide, germanium oxide, and gallium oxide; which article is over 80% by volume crystalline.

9 Claims, No Drawings

IR TRANSMITTING RARE EARTH GALLOGERMANATE GLASS-CERAMICS

BACKGROUND OF INVENTION

1. Field Of Invention:

This invention pertains to the field of glass-ceramics.

2. Description Of Prior Art:

Infrared (IR) transparent materials used for missile domes and windows must withstand harsh environmental conditions such as high speed flights, high accelerations or decelerations resulting in thermal shock, high temperature, humid conditions, and impact of rain drops, sand and other harsh debris such as pollutants etc. The properties that are critical for a missile dome or a window application are high IR transparency, high thermal shock resistance, excellent chemical durability, high Young's modulus, and fracture toughness which results in a high damage threshold velocity for rain and sand erosion. There are two important regions for IR sensing: the midwave IR window region, which is from 2 to 5 microns, and the longwave IR window region, which is from 8 to 14 microns. Currently, there are three commercially available materials in the midwave IR window region: sapphire, spinel, and zinc sulfide. Other materials developed for applications in this region are magnesium fluoride, Corning's germanate glass 9754, and Naval Research Lab's barium gallogermanate glass and its corresponding glass-ceramics.

Aluminosilicate glasses containing rare earths for in vivo radiation delivery are known. These glasses contain radioactive isotopes of rare earth ions as the primary glass component and have excellent chemical durability in the in vivo environment. Glass formation in other rare earth aluminosilicates, yttrium gallosilicates, rare earth aluminogermanates, and rare earth gallogermanates, have been discussed in connection with applications of the glasses in Faraday rotation because of their large Verdet coefficients.

Glasses containing rare earths are known for dome and window application in the system of $La_2O_3$—$Ta_2O_5$—$ZnO$—$GeO_2$. These glasses have hardness values of about 550 kg/mm$^2$ and thermal expansion coefficient in the range of 6.2–7.4 ppm/K.

SUMMARY OF INVENTION

It is an object of this invention to produce an IR transparent glass-ceramic with improved physical properties.

Another object of this invention is a glass-ceramic with improved fracture toughness, and with improved thermal shock and erosion resistance, which glass-ceramic can transmit in the infrared region of about 2–5 microns at a transmission above 80% for a 0.5 cm thick sample.

Another object of this invention is a glass-ceramic that can be produced at a small fraction of the cost of the commercially available materials currently used for infrared domes and other related IR window applications.

Another object of this invention is a glass-ceramic that can be produced cheaply pursuant to conventional glass-forming procedures and that can be formed into intricate configurations.

These and other objects of this invention can be accomplished by an infrared-transmitting glass-ceramic article prepared by processing rare earth oxide gallogermanate glass-ceramic components, also including nucleating agents. The resulting glass-ceramic product is nearly all crystalline, maintains a high infrared transparency in the region of 2–5 microns and has improved thermal and mechanical properties.

DESCRIPTION OF PREFERRED EMBODIMENTS

This invention pertains to a novel non-silica gallogermenate glass-ceramic article containing yttrium oxide, a rare earth oxide or a mixture thereof containing sufficient crystallinity to enhance mechanical property thereof, typically at least 80% crystallinity.

The article is a glass-ceramic that is crystallized from a rare earth oxide gallogermanate glass and has improved thermal and physical properties. The following Table A compares some improved properties of the novel glass-ceramic with the properties of the base glass and competing materials.

TABLE A

|  | Sapphire | Spinel | MgF$_2$ | ZnS | Corning glass (9754) | BGGG Glass | BGG Glass-Ceramic | REOGG Glass | REOGG Glass-Ceramic |
|---|---|---|---|---|---|---|---|---|---|
| Hardness (Kg/mm$^2$) | 2200 | 1600 | 578 | 250 | 560 | 400 | 560 | 700 | 1000 |
| Young's Mod. (GPa) | 344 | 193 | 114 | 74 | 84 | 70 | 120 | 120 | 200 |
| Strength (MPa) | 400 | 190 | 150 | 100 | 44 | 60 | 130 | 120 | 200 |
| Fracture Toughness (MPa · m$^{1/2}$) | 2.0 | 1.9 | 0.9 | 1.0 | 0.7 | 0.7 | 1.5 | 0.9 | 2.0 |
| CTE (ppm/K) | 5.3 | 5.6 | 10.4 | 7.0 | 6.2 | 7.6 | 5.9 | 6.5 | 5.6 |
| Damage Threshold Velocity (m/s) | 500 | 400 | 360 | 175 | 200 | 186 | 335 | 236 | 439 |
| Chemical Durability in water (g/cm$^2$/min) | <10$^{-9}$ | <10$^{-9}$ | <10$^{-9}$ | <10$^{-9}$ | 10$^{-5}$ | 10$^{-6}$ | 10$^{-7}$ | 10$^{-8}$ | 10$^{-9}$ |

TABLE A-continued

|  | Sapphire | Spinel | MgF$_2$ | ZnS | Corning glass (9754) | BGGG Glass | BGG Glass-Ceramic | REOGG Glass | REOGG Glass-Ceramic |
|---|---|---|---|---|---|---|---|---|---|
| Ease of Formation | difficult | difficult | easy | difficult | easy | easy | easy | easy | easy |
| Relative Cost | very high | high | low | high | low | low | low | low | low |

In the above Table A, the term "BGG Glass" refers to the precursor glass for the "BGG Glass-ceramic" of U.S. Pat. No. 5,486,495. Also, the term "REOGG" used in the table is an acronym of "rare earth oxide gallogermanate" and refers to the glass or the glass-ceramic of the present invention. Although fracture toughness, coefficient of thermal expansion (CTE), transmission in the mid infrared region and the relative manufacturing cost of the rare earth gallogermanate glass-ceramics is comparable to or better than those of sapphire, spinel and magnesium fluoride, combination of properties and the cost of the glass-ceramic disclosed herein makes this glass-ceramic more attractive for same or similar applications. The damage threshold velocity test was calculated on the basis of thermomechanical properties.

The rare earth gallogermanate glass-ceramics of this invention have hardness of 800–1200 kg/mm$^2$, typically about 1000 kg/mm$^2$; Young's modulus of 150–250 GPa, typically about 200 GPa; strength of 150–250 MPa, typically about 200 MPa; fracture toughness of 1.5–2.5 MPa.m$^{1/2}$, typically about 2.0 MPa.m$^{1/2}$; thermal expansion of 5–6 ppm/K; better than 80% transmission in the infrared region of 2.0–5.5 microns; chemical durability in water at room temperature of up to $1 \times 10^{-9}$ g/cm$^2$/min; ease of formation of complex shapes; and a very low relative cost compared to sapphire, spinel, and zinc sulfide.

The rare earth gallogermanate glass-ceramics of this invention can be made by the method that includes the steps of mixing the glass-ceramic components, such as, oxides, carbonates, halides, nitrates, sulfates, or mixtures thereof of the constituting cations; melting the components to form a molten mass; cooling the molten mass to form a solid glass article; annealing the glass article; nucleating the solid article by heating it to an elevated temperature for a period of a few minutes to several hours to develop nuclei in the article; and crystallizing the nucleated article by heating it, after nucleation, at an elevated temperature for a period of at least one half of a minute to grow the crystallites to an average diameter of less than about 500 nanometers (nm); and cooling to form the glass-ceramic with improved thermal and physical properties.

Controlled nucleation and crystal growth are critical in determining the properties of the final glass-ceramic product. Nucleation can be homogenous or heterogenous. In homogenous nucleation, the nuclei that first grow have the same chemical composition as the crystals that grow upon them. In heterogeneous nucleation, the nuclei have different chemical composition to the crystal. Often, it may be necessary to add nucleating agents to nucleate or increase the nuclei density in the glass. These nucleating agents can either form crystalline nuclei upon heat treatment or result in a glass-in-glass phase separation at a very fine scale. A phase separated glass may have two or more glassy phases present. In the case of crystalline nuclei, the nucleating agent can either precipitate individually or can form compounds with other additives or glass constituents. In the case of glass-in-glass phase separation the phase separated regions can either crystallize forming nuclei or enhance the nucleation at the liquid-liquid interface. One or more nucleating agents can be added to the glass to produce optimum nuclei density. Nucleating agents are soluble in the molten glass but their solubility decreases as the melt is cooled down. These nucleating agents form nucleation sites for crystallization, by one of the mechanisms discussed above, when the molten glass is cooled under controlled conditions from the melt or is reheated from lower temperatures under controlled conditions. The crystal growth rate can be affected by the dopants or impurities which change the viscosity or the activation energy for viscous flow.

The glass-ceramic composition includes glass components and nucleating agents. There can be at least three, preferably at least four glass components although the glass-ceramic article can contain more components than specified herein.

The primary glass components include yttrium oxide ($Y_2O_3$) and/or a rare earth oxide, germanium oxide ($GeO_2$), and gallium oxide ($Ga_2O_3$) The secondary glass components may include calcium oxide (Cao), zinc oxide (ZnO), alumina ($Al_2O_3$), lead oxide (PbO), indium oxide ($In_2O_3$), and bismuth oxide ($Bi_2O_3$). Amount of a rare earth oxide is 2–30, preferably 5–20 mole percent; amount of germanium oxide is 25–80, preferably 35–70 mole percent; and amount of gallium oxide is 5–30, preferably 10–20 mole percent. These amounts are based on the total moles of the glass components. The secondary glass components can be used in conventional amounts.

Yttrium oxide, rare earth oxide, or a mixture thereof, in this glass improves the properties of the resulting glass-ceramics. Although any suitable rare earth oxide can be used, yttrium oxide, lanthanum oxide, gadolinium oxide, and mixtures thereof are particularly suitable.

The glass-ceramic composition includes about 0–20, preferably 0–10 weight percent, based on the germanate glass components, of at least one nucleating agent. If an insufficient amount of nucleating agent is used, nuclei density and hence the crystal density will be low, resulting in only marginal or less than optimal improvement in the properties of the glass-ceramic. If too much nucleating agent is used, glass composition will deviate too far from the original base glass composition resulting in an inferior product. Typical nucleating agents include titanium oxide ($TiO_2$), zirconium oxide ($ZrO_2$), bismuth oxide ($Bi_2O_3$), phosphorus pentoxide ($P_2O_5$), hafnium oxide ($HfO_2$), indium oxide ($In_2O_3$), arsenic oxide ($As_2O_3$), tantalum oxide ($Ta_2O_5$), vanadium oxide ($V_2O_5$), chromium oxide ($Cr_2O_3$), molybdenum oxide ($MoO_3$) and tungsten oxide ($WO_3$). A combination of the nucleating agents can constitute a nucleating agent. Preferred nucleating agents are zirconium oxide and titanium oxide.

It should be understood that other components can be included in making the glass-ceramic article disclosed herein as long as they do not significantly change the physical properties of the article.

Components of the glass-ceramic composition are typically oxide powders that are mixed sufficiently in a suitable receptacle to distribute the components. These oxides can be partially or completely replaced by other salts containing the constituting cations. Mixing time can be on the order of about one-half hour if a mixing tumbler is used.

After mixing the components, the resulting mixture is transferred to a vessel that can withstand high glass melting temperatures. Such a vessel is typically a platinum crucible that can be preheated before the mixture is transferred thereto. To melt the glass-ceramic composition disposed in a platinum crucible, a furnace is heated to about 1350°–1600° C. in air or inert atmosphere, and the crucible is placed in the furnace for about ½–3 hours until the contents of the crucible melt. Once contents of the crucible are melted, the crucible is removed from the furnace and conventional techniques can be used to produce a glass article of any size or shape. A typical technique of preparing an article involves pouring the molten glass into a mold, forming the glass into the desired shape, and cooling to solidify the molten glass.

The solidified glass in the form of an article is then annealed to relieve inherent stresses therein. This can be done by heating the glass article to about the glass transition temperature ($T_g$) of the glass and holding it at that temperature for an amount of time sufficient to substantially relax stresses from the glass, typically about 10 minutes to 4 hours followed by slow cooling. At this point, the glass is amorphous and not a glass-ceramic. This annealing step can be avoided by cooling the melt directly to the nucleation temperature.

To convert the glass from amorphous to essentially all crystalline, i.e., to convert the glass to glass-ceramic, the glass is subjected to nucleation followed by crystallization.

Nucleation throughout the germanate glass can be accomplished by heating the germanate glass article to a temperature range of about 600–900, preferably 700°–850° C. over a time period of 1–100, preferably 2–10 hours. The glass transition temperature ($T_g$) for the germanate glass is above about 600° C. and for nucleation to occur, the glass is heated above $T_g$. Nucleation can be represented as a bell-shaped curve with nucleation starting at about 600° C. to 8000° C. and terminating at about 700° C. to 900° C., with the maximum nucleation rate taking place at the maximum point on the nucleation curve. Typically, at least about $10^{11}$–$10^{12}$ nuclei/cm$^3$ is desirable to realize significant property improvements after crystallization in the germanate glass-ceramic article.

In order to generate nuclei, it may be necessary to heat or cool the glass. Application of an energetic force, generally facilitates or expedites nucleation. Energetic force can be heat treatment above $T_g$ of the glass.

Neither nucleation nor phase separation need to commence at room temperature but can commence at any temperature as long as the objectives of nucleation or phase separation are achieved.

Crystallization or growth of nucleated crystals is typically carried out by heating nucleated glass to a temperature in the approximate range of 750°–1200° C. for a period of about ½ minute to about 8 hours, preferably about 800°–900° C. for a period of about 1 minute to about 2 hours. The crystal growth rate can be represented as a bell-shaped curve with crystallization starting at about 750° C. and terminating at about 1200° C., with the maximum crystal growth rate taking place at the maximum point on the growth rate curve. Melting of the germanate glass commences at about 1200° C. Although the crystal growth rate curve is generally at a higher temperature range than is the nucleation curve, the upper temperature range of the nucleation curve overlaps the lower temperature range of the crystallization curve. The overlap means that at the overlapping temperatures, nucleation and crystallization proceed simultaneously although at different rates, depending on the location on the respective curves.

The crystals in glass-ceramic are typically different chemically from the nuclei although they can be the same as the nuclei. In a glass-ceramic containing yttrium oxide and/or rare earth oxide, gallium oxide and, germanium oxide, the crystals are yttrium and/or rare earth, gallium and germanium oxide and their average size is typically less than about 500 nanometers and larger than about 20 nanometers. The crystals should not be too large since the crystal oversize can lead to diminished infrared transparency of the glass-ceramic due to scattering losses. The size of the crystals should preferably be less than one tenth of the wavelength of the transmitted light. Additionally, regardless of crystal size, improvement in the thermal and physical properties in the glass-ceramic typically requires that the glass-ceramic has large volume fraction of crystalline phase (s), approaching 100%. After crystallization, the glass-ceramic is in the solid state and is cooled slowly to about room temperature.

The invention having been generally described, the following example is given as a particular embodiment of the invention to demonstrate the practice and advantages thereof. It is understood that the example is given by way of illustration and is not intended to limit in any manner the specification or any claim that follows.

EXAMPLE I

This example demonstrates preparation of a glass-ceramic of this invention from a glass wherein nucleation was achieved without phase separation.

The following batch of the glass-ceramic was prepared, as summarized in Table B, below:

TABLE B

| Base Glass | Mole Percent | Weight Percent | Weight (grams) |
| --- | --- | --- | --- |
| $Y_2O_3$ | 8.33 | 12.54 | 3.762 |
| $Gd_2O_3$ | 8.33 | 20.13 | 6.040 |
| $Ga_2O_3$ | 16.67 | 20.84 | 6.251 |
| $GeO_2$ | 66.67 | 46.49 | 13.947 |
| Nucleating Agent | | | |
| *$ZrO_2$ | | 5 | 1.5 |

*Weight % addition to the base glass composition.

The batch was mixed in a tumbler for about one-half hour and then melted in a platinum crucible at about 1400° C. over a period of about one-half hour. As the batch was melted, dry nitrogen gas was flowed over the batch to keep the water interaction therewith to a minimum. The melted batch was then quenched to about room temperature by dipping the bottom of the crucible in water, whereby a solid, amorphous glass was formed. For annealing, the glass was reheated to about 785° C. for about one hour and then slowly cooled at about 1° C/min to 400° C. followed by furnace cooling to about room temperature.

The glass was then nucleated by reheating to about 800° C. and holding at 800° C. for about four hours and then crystallized by heating the glass at about 10° C. per minute to about 840° C. and holding at 840° C. for about one minute.

The nucleation and crystallization heat treatments produced glass-ceramic that was over about 98% by volume crystalline. The resulting glass-ceramic showed infrared transmission beyond 5 microns; its fracture toughness over the base glass increased from 0.9 to 2.0 MPa-m$^{1/2}$ ; its Young's modulus and strength were 200 GPa and 200 MPa respectively exceeding those of all other materials listed in Table A, except sapphire; its damage threshold velocity for rain erosion resistance was 439 m/s, which was below that for sapphire but above that of all other window materials in this midwave IR window region; its thermal expansion over the base glass decreased from 6.5 to 5.6 ppm/K; its Vicker's hardness over the base glass increase from 700 to 1000 kg/mm$^2$; and its relative cost is much lower than that of the competing materials.

Many modifications and variations of the present invention are possible in light of the above techniques. It is, therefore, to be understood that within the scope of the appended claims, the invention may be practiced otherwise than as specifically; described.

What is claimed is:

1. A glass-ceramic article which can transmit in the infrared region of about 2–5 microns, said article comprising 2–30 mole percent of an additive oxide, 25–80 mole percent germanium oxide, and 5–30 mole percent gallium oxide, based on total moles of the said additive oxide, germanium oxide, and gallium oxide, said additive oxide is selected from the group consisting of yttrium oxide, rare earth oxides, and mixtures thereof.

2. The article of claim 1 comprising 10–20 mole percent of the said additive oxide, 35–70 mole percent germanium oxide, and 10–20 mole percent gallium oxide.

3. The article of claim 2 which includes 0–20 weight percent of a nucleating agent, based on total weight of said additive oxide, germanium oxide, and gallium oxide.

4. The article of claim 3 wherein said nucleating agent is selected from the group consisting of titanium oxide, zirconium oxide, bismuth oxide, phosphorous pentoxide, hafnium oxide, indium oxide, arsenic oxide, tantalum oxide, vanadium oxide, chromium oxide molybdenum oxide, tungsten oxide and mixtures thereof; and crystals in said glass-ceramic article have a diameter above about 20 nm and below about 500 nm.

5. The article of claim 3 wherein said nucleating agent is selected from the group consisting of titanium oxide, zirconium oxide, and mixtures thereof.

6. The article of claim 5 wherein said article has hardness of 800–1200 GPa; Young's modulus of 150–250 MPa; and fracture toughness of 1.5–2.5 MPa.m$^{1/2}$.

7. An article which transmits in the infrared region of about 2–5 microns and which is a glass-ceramic containing sufficient crystallinity to enhance mechanical properties thereof wherein crystals in said glass-ceramic article have a diameter above 20 nm and below about 500 nm; said article comprises 5–20 mole percent of an additive oxide selected from the group consisting of yttrium oxide, lanthanum oxide, gadolinium oxide, and mixtures thereof, 35–70 mole percent germanium oxide, and 10–20 mole percent gallium oxide; said article has hardness of 800–1200 GPa, Young's modulus of 150–250 MPa, and fracture toughness of 1.5–2.5 MPa.m$^{1/2}$ and said article includes about 0–20 weight percent of a nucleating agent, based on total weight of said additive oxide, germanium oxide, and gallium oxide used to make said article, said nucleating oxide is selected from the group consisting of titanium oxide, zirconium oxide, and mixtures thereof.

8. The article of claim 1 having crystallinity of at least 80% and transmission in the 2–5 micron region above 80% for a 0.5 cm thick sample.

9. The article of claim 7 having crystallinity of at least 80% and transmission in the 2–5 micron region above 80% for a 0.5 cm thick sample.

* * * * *